United States Patent [19]

Blizzard

[11] 4,322,518
[45] Mar. 30, 1982

[54] CURABLE SILICONE COMPOSITIONS COMPRISING LIQUID RESIN AND USES THEREOF

[75] Inventor: John D. Blizzard, Bay City, Mich.

[73] Assignee: Dow Corning Corporation, Midland, Mich.

[21] Appl. No.: 212,189

[22] Filed: Dec. 2, 1980

[51] Int. Cl.$^3$ .............................................. C08G 77/06
[52] U.S. Cl. .................................... 528/15; 427/387; 427/388.1; 427/388.5; 427/391; 427/393; 427/393.5; 428/429; 428/447; 428/450; 428/474.4; 428/475.5; 528/18; 528/21; 528/24; 528/31; 528/32; 528/33; 525/477
[58] Field of Search .................... 528/15, 18, 21, 24, 528/31, 32, 33; 525/477; 427/387, 388.1, 388.5, 391, 393, 393.5; 428/429, 447, 450, 474.4, 475.5

[56] References Cited

U.S. PATENT DOCUMENTS

| | | | |
|---|---|---|---|
| 3,527,659 | 9/1970 | Keil | 117/145 |
| 3,627,851 | 12/1971 | Brady | 260/825 |
| 3,772,247 | 11/1973 | Flannigan | 260/46.5 H |

*Primary Examiner*—Melvyn I. Marquis
*Attorney, Agent, or Firm*—George A. Grindahl

[57] ABSTRACT

Curable silicone compositions are disclosed which comprise a liquid copolymeric organopolysiloxane comprising $SiO_2$ and silicon-bonded hydroxyl radicals and/or silicon-bonded hydrogen radicals in varying amounts and a polydiorganosiloxane containing silicon-bonded vinyl radicals and/or silicon bonded hydroxyl radicals. The curable silicone compositions are useful as coatings for substrates.

14 Claims, No Drawings

CURABLE SILICONE COMPOSITIONS COMPRISING LIQUID RESIN AND USES THEREOF

BACKGROUND OF THE INVENTION

The present invention relates to improved curable silicone compositions. More particularly, the present invention relates to curable silicone coating compositions comprising $SiO_2$-based resins and a polydiorganosiloxane.

Keil, U.S. Pat. No. 3,527,659, discloses a release agent for substrates consisting of a dimethylpolysiloxane-based formulation which is curable to an elastomer and a copolymer of $R_3SiO_{\frac{1}{2}}$ and $SiO_2$ units having no more than 0.7 weight percent silicon-bonded hydroxyl groups. Adhesive release force of the release agent is said to increase as the amount of copolymer in the release agent is increased.

Brady, U.S. Pat. No. 3,627,851, discloses curable compositions consisting essentially a vinyl- or silanol-containing polydiorganosiloxane gum, a benzene-soluble copolymeric siloxane consisting of dimethylhydrogensiloxy units, trimethylsiloxy units and $SiO_2$ units and a platinum-containing catalyst.

Flannigan, U.S. Pat. No. 3,722,247 discloses organopolysiloxane resins containing $R_3SiO_{\frac{1}{2}}$ units and $SiO_2$ units, along with RHSiO units and/or $HSiO_{3/2}$ units which are suitable for a wide variety of uses, such as for modifying siloxane paper-treating compositions, for preparing other reactive resins and for crosslinking room temperature curing elastomer-forming compositions.

A principal disadvantage of the compositions of the art which comprise a $SiO_2$-based resin is that the resin is a solid at room temperature and requires the use of a solvent to aid its mixing with the other components of the compositions. However, it is currently highly desirable to prepare solventless silicone compositions so that emissions of solvents into the atmosphere during their preparation and use can be avoided.

SUMMARY OF THE INVENTION

It is an object of this invention to provide solventless silicone compositions comprising a liquid $SiO_2$-based resin. It is a further object of this invention to provide curable silicone compositions comprising a curable silicone polymer fluid or gum and a liquid $SiO_2$-based resin as the sole curing agent for the fluid or gum. It is another object of this invention to prepare solventless silicone coating compositions which, after being applied to a substrate and cured, have controllable release forces for adhesives adhered thereto.

These objects, and others which will be obvious to one skilled in the organopolysiloxane art upon considering the following disclosure and appended claims, are obtained by the compositions of this invention comprising (I) a liquid copolymeric organopolysiloxane prepared by a method comprising (A) forming a homogeneous mixture having an acid number greater than zero and comprising (a) an organic solvent solution of a resinous copolymeric siloxane containing silicon-bonded hydroxyl radicals and consisting essentially of $R_3SiO_{\frac{1}{2}}$ siloxane units and $SiO_{4/2}$ siloxane units wherein the ratio of the number of said $R_3SiO_{\frac{1}{2}}$ siloxane units to the number of said $SiO_{4/2}$ siloxane units has a value of from 0.6/1 to 0.9/1 and each R denotes, independently, a monovalent hydrocarbon radical, and (b) a liquid organohydrogenpolysiloxane wherein each organic radical is, independently, a monovalent hydrocarbon radical, there being an average of at least one silicon-bonded hydrogen radical per molecule of said organohydrogenpolysiloxane, and (B) heating said homogeneous mixture to remove substantially all of said organic solvent therefrom, and (II) a polydiorganosiloxane having the formula $ZR'''_2SiO(R'''_2SiO)_cSiR'''_2Z$ wherein Z denotes hydroxyl or R''' and each R''' denotes, independently, a monovalent hydrocarbon radical, there being an average of at least two vinyl radicals or silicon-bonded hydroxyl radicals per molecule and c has a value sufficient to provide a viscosity of from 0.1 to 10,000 Pa·s at 25° C. for the polydiorganosiloxane.

DETAILED DESCRIPTION OF THE INVENTION

Component (I) of the compositions of this invention is designated herein as a liquid copolymeric organopolysiloxane. It is prepared by reacting a first reactant (a), designated herein as a resinous copolymeric siloxane, with a second reactant (b), designated herein as a liquid organohydrogenpolysiloxane.

Component (a) that is used to prepare the liquid copolymeric organopolysiloxane (I) is an organic solvent solution of a resinous copolymeric siloxane which consists essentially of $R_3SiO_{\frac{1}{2}}$ siloxane units and $SiO_{4/2}$ siloxane units. The resinous copolymeric siloxane has a complex, as-yet-undetermined structure; however, for the purposes of this disclosure it is fully characterized by the ratio of said siloxane units therein, by its silanol, i.e. silicon-bonded hydroxyl, content and by its solubility in organic solvents, such as benzene.

The resinous copolymeric siloxane portion of component (a) consists of from 0.6 to 0.9 $R_3SiO_{\frac{1}{2}}$ units for every $SiO_{4/2}$ unit. Each R denotes a monovalent hydrocarbon radical; such as an alkyl radical, such as methyl, ethyl, isopropyl, butyl and hexyl; an alkenyl radical, such as vinyl and allyl; an aryl radical, such as phenyl, tolyl and xylyl; an arylalkyl radical, such as beta-phenylethyl and beta-phenylpropyl; and a cycloaliphatic radical, such as cyclopentyl, cyclohexyl and cyclohexenyl. Preferably all R radicals in component (a) are lower alkyl radicals although a minor portion of them can be replaced with other monovalent hydrocarbon radicals such as the vinyl radical and/or the phenyl radical to provide additional properties for the resinous copolymer such as the reactivity attendent therewith. The resinous copolymeric siloxane portion further comprises from 0.1 to 5 percent by weight of silicon-bonded hydroxyl radicals and frequently comprises trace amounts of silicon-bonded alkoxy radicals such as methoxy, ethoxy or isopropoxy radicals which arise from the particular method that is used to prepare said resin copolymeric siloxane.

In a preferred curable coating composition of this invention the resinous copolymeric siloxane portion of component (a) consists essentially of $(CH_3)_3SiO_{\frac{1}{2}}$ siloxane units and $SiO_{4/2}$ siloxane units, in the number ratio stated above, and has a silicon-bonded hydroxyl content of from 1 to 5 percent by weight.

Resinous copolymeric siloxanes consisting of $R_3SiO_{\frac{1}{2}}$ units and $SiO_{4/2}$ units are well known in the art and are described by Daudt et al., U.S. Pat. No. 2,676,182, and by Goodwin, U.S. Pat. No. 2,857,356, the disclosures of which are hereby incorporated herein by reference to teach how to prepare resinous copolymeric siloxanes which are suitable for use in the compositions of this invention. Briefly, in these methods, an aqueous solution of sodium silicate (e.g. No. 9 sodium silicate sold by DuPont ®) is acidified to the proper pH by adding it to a mixture of hydrochloric acid and isopropanol and the resulting acidic silica hydrosol is then treated with a source of $R_3SiO_{\frac{1}{2}}$ siloxane units such as $R_3SiOCH_3$, $R_3SiCl$ or $R_3SiOSiR_3$ dissolved in a mixture of isopropanol and xylene. After being heated the reaction mixture is cooled and is separated into an aqueous phase, which is discarded, and a non-aqueous phase comprising the resinous copolymeric siloxane, which is further washed with water to reduce its acid number and to remove water-soluble components, such as isopropyl alcohol. Preferably the acidic resinous copolymeric siloxanes which are prepared by these methods are washed with water to remove most, but not all, of the acid therein. For example, resinous copolymeric siloxanes which have been prepared by the method of Daudt et al. typically have sufficient acid remaining therein to provide an acid number of from 0.2 to 2.0, as measured by the method hereinafter disclosed, based on the solvent-free resinous copolymeric siloxane. These materials are preferred.

Resinous copolymeric siloxanes are typically prepared in an organic solvent which can conveniently serve as the organic solvent portion of component (a). Alternatively, the resinous copolymeric siloxane can be prepared in one organic solvent and subsequently can be transferred to a second organic solvent, if desired, to form component (a). If the resinous copolymeric siloxane does not contain any organic solvent, one or more organic solvents should be mixed therewith before or during preparation of homogeneous mixture to be heated.

The particular organic solvent portion of component (a) is not critical and can be for example an aliphatic hydrocarbon, an aromatic hydrocarbon or halogenated derivatives of either or mixtures thereof. Preferably the organic solvent is one that forms an azeotrope with water so that any water that is formed during the subsequent heating step detailed below can be conveniently removed by azeotropic distillation. Particularly useful organic solvents include benzene, toluene, xylene, trichloroethylene and mineral spirits.

The amount of resinous copolymeric siloxane contained in component (a) is not critical and can range from 10 to 90 percent by weight. It is preferred that only as much organic solvent as is needed to prepare a homogeneous mixture of resinous copolymeric siloxane and liquid organohydrogenpolysiloxane be used in order to minimize the amount of time and/or energy needed to subsequently remove it from the mixture as described hereinafter. A preferred component (a) contains approximately 60 to 70 percent by weight resinous copolymeric siloxane and the balance solvent.

Component (b) that is used to prepare the liquid copolymeric organopolysiloxane (I) is any liquid organohydrogenpolysiloxane containing an average of at least one silicon-bonded hydrogen radical per molecule, and can have a linear, cyclic or branched structure or combinations thereof. Thus, component (b) has the unit formula $R'_mH_nSiO_{(4-m-n)/2}$ wherein m and n denote positive numbers whose sum is less than 4, preferably from 1.9 to 2.1. The organic radicals (R') in component (b) can be any of the R radicals denoted above. Preferably, although not necessarily, the organic radicals (R') in component (b) are the same as the organic radicals (R) in component (a).

Examples of organohydrogenpolysiloxanes that are suitable for use as component (b) include cyclic organohydrogenpolysiloxanes of the unit formula $R'_mH_{2-m}SiO$ such as $\{(CH_3)(H)SiO\}_x$ wherein x is 3, 4, 5, 6 and higher and $\{(CH_3)(H)SiO\}_y\{(CH_3)_2SiO\}_z$ wherein the sum of y plus z is 3, 4, 5, 6 and higher; and linear organohydrogenpolysiloxanes of the formula $R''R'_2SiO(R'_2SiO)_a(R'HSiO)_bSiR'_2R''$, such as

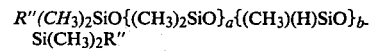

wherein R'' denotes H or methyl and a and b each denote zero or a number greater than zero, provided there is at least one silicon-bonded hydrogen radical per molecule, such as $H(CH_3)_2SiO\{(CH_3)_2SiO\}_aSi(CH_3)_2H$, $(CH_3)_3SiO\{(CH_3)(H)SiO\}_bSi(CH_3)_3$, $(CH_3)_3SiO\{(CH_3)(H)SiO\}_b\{(CH_3)_2SiO\}_aSi(CH_3)_3$ and $H(CH_3)_2SiO\{(CH_3)_2SiO\}_a\{(CH_3)(H)SiO\}_bSi(CH_3)_2H$.

An organohydrogenpolysiloxane having the formula $(CH_3)_3SiO\{(CH_3)(H)SiO\}_bSi(CH_3)_3$ wherein b has an average value of from 30 to 70 is a highly preferred component (b), particularly when it is desired that the liquid copolymeric organopolysiloxane prepared therefrom contain relatively large amounts of silicon-bonded hydrogen radicals.

Liquid organohydrogenpolysiloxane (b) can have any viscosity; however, it preferably has a viscosity of less than 1 pascal-second at 25° C. when used in amounts of less than 60 parts by weight for every 40 parts by weight of resinous copolymeric siloxane.

Organohydrogenpolysiloxanes and their preparation are well known in the organosilicon polymer art; some are commercially available. Briefly the preparation of organohydrogenpolysiloxanes can be accomplished in any suitable manner such as by hydrolyzing a mixture of suitably hydrolyzable silanes, such as chlorosilanes, and equilibrating the resulting hydrolyzate under acid catalysis. Alternatively, a mixture of suitable siloxanes, such as cyclic siloxanes and linear siloxanes, can be copolymerized and equilibrated under acid catalysis.

In the preparation of component (I) the amounts of resinous copolymeric siloxane and liquid organohydrogenpolysiloxane that are mixed may vary widely. Generally, the viscosity of the copolymeric organopolysiloxane that is produced varies directly with the viscosity of the organohydrogenpolysiloxane and inversely with its weight percent in the homogeneous mixture of components (a) and (b). Liquid copolymeric organopolysiloxanes can be obtained when as little as about 10 percent by weight of organohydrogenpolysiloxane is used, based on the weight of resinous copolymeric siloxane plus organohydrogenpolysiloxane. Liquid copolymeric organopolysiloxanes of this invention which contain less than about 10 percent by weight of resinous copolymeric siloxane component are not expected to significantly demonstrate the benefits for which the resinous copolymeric siloxane is used, such as a strengthening component in curable silicone compositions.

A highly preferred liquid copolymeric organopolysiloxane is obtained when the homogeneous mixture that is heated comprises from 40 to 60 parts by weight of resinous copolymeric siloxane consisting of $(CH_3)_3SiO_{\frac{1}{2}}$ units and $SiO_{4/2}$ units and containing from 1 to 5 percent by weight of silicon-bonded hydroxyl radicals and from 40 to 60 parts by weight of organohydrogenpolysiloxane having the formula $(CH_3)_3SiO\{(CH_3)(H)SiO\}_{30}$ to $_{70}Si(CH_3)_3$. The resulting copolymeric organopolysiloxanes provide controlled adhesive release in the curable silicone coating compositions of this invention.

In the preparation of component (I) a homogeneous mixture is formed by thoroughly mixing the desired amounts of component (a) and component (b) and, if necessary, an acid, preferably a strong acid such as hydrochloric acid, to provide an acid number greater than zero therefor. Preferably the acid number of the homogeneous mixture, extrapolated to zero solvent content, has a value of from 0.1 to 1. Preferably component (a) is sufficiently acidic, as prepared, to provide this acidity for the homogeneous mixture.

The resulting homogeneous mixture is immediately or subsequently heated to volatilize the organic solvent therefrom. Said heating is preferably initially done at atmospheric pressure and is then continued at reduced pressure to accelerate the removal of said solvent.

In a preferred embodiment of this invention the homogeneous mixture of (a) plus (b) is heated to about 150° C. at atmospheric pressure and is then subjected to a gradually decreasing pressure, without an increase in temperature, to remove substantially all of the organic solvent therefrom. By substantially it is meant herein that the liquid copolymeric organopolysiloxane contains less than about 5 percent, and preferably less than about 1 percent, by weight organic solvent.

Alternatively the homogeneous mixture can be partially devolatilized at room temperature, such as by evaporation, and the partially devolatilized mixture then heated to remove substantially all of the organic solvent therefrom.

The liquid copolymeric organopolysiloxanes (I) contain silicon-bonded hydroxyl radicals and/or silicon-bonded hydrogen radicals which provide chemical reactivity therefor in the compositions of this invention. The amount of silicon-bonded hydrogen radicals and/or silicon-bonded hydroxyl radicals therein depends upon the ratio of said radicals in, and the acid number of, the homogeneous mixture that is used for its preparation.

To assure that the liquid copolymeric organopolysiloxane contains silicon-bonded hydrogen radicals, for subsequent reaction with e.g. silicon-bonded hydroxyl or vinyl radicals, it is believed that the homogeneous mixture that is prepared should have at least 2, and preferably at least 3, silicon-bonded hydrogen radicals for every silicon-bonded hydroxyl radical. An upper limit of 2580 for the ratio of silicon-bonded hydrogen radicals to silicon-bonded hydroxyl radicals in the homogeneous mixture occurs in a mixture of 10 parts by weight of resinous copolymeric siloxane having a silanol content of 0.1 percent by weight and 90 parts by weight of an organohydrogenpolysiloxane having a silicon-bonded hydrogen content of 1.7 percent by weight.

To assure that the liquid copolymeric organopolysiloxane contains silicon-bonded hydroxyl radicals, for subsequent reaction with e.g. silicon-bonded hydroxyl or hydrogen radicals, it is believed that the acid number of the homogeneous mixture that is heated should have a value of less than about 2.

Component (II) of the compositions of this invention is designated herein as a polydiorganosiloxane and has the general formula $ZR'''_2SiO(R'''_2SiO)_cSiR'''_2Z$. Each Z in the formula denotes a silicon-bonded hydroxyl radical or an R''' radical. Each R''' denotes a monovalent hydrocarbon radical selected from the group of R radicals denoted above for component (I) with the proviso that when either or both Z denote R''' radicals at least two R''' radicals in the formulae are vinyl radicals. Thus, component (II) comprises silicon-bonded hydroxyl radicals and/or vinyl radicals to provide reaction sites for curing the compositions of this invention. Preferably, but not necessarily, the R''' radicals in component (II) are the same as the R and R' radicals in component (I) in a composition of this invention.

In the curable coating compositions of this invention component (II) is a polydiorganosiloxane fluid or gum having the formula denoted above wherein at least 95 percent of the organic radicals are the methyl radical, 0 to 5 percent are the phenyl radical and 0 to 5 percent are the vinyl radical.

Examples of polydiorganosiloxane fluids and gums that are suitable for use as component (II) in the compositions of this invention include those having the following average formulae, wherein Me denotes methyl, Vi denotes vinyl and Ph denotes phenyl: $ViMe_2SiO(Me_2SiO)_cSiMe_2Vi$, $ViPhMeSiO(Me_2SiO)_cSiMePhVi$, $HOMe_2SiO(Me_2SiO)_cSiMe_2OH$, $ViPhMeSiO(Me_2SiO)_{c(1-d)}(MeViSiO)_{cd}SiMePhVi$, $ViMe_2SiO(Me_2SiO)_{c(1-d)}(MeViSiO)_{cd}SiMe_2Vi$, $HOMe_2SiO(Me_2SiO)_{c(1-d)}(MeViSiO)_{cd}SiMe_2OH$, $HOMe_2SiO(Me_2SiO)_{c(1-d)}(MePhSiO)_{cd}SiMe_2OH$, and $Me_3SiO(Me_2SiO)_{c(1-d)}(MeViSiO)_{cd}SiMe_3$. Mixtures of two or more polydiorganosiloxanes having the above general formula can also be used. Of course, the several diorganosiloxane units in a polydiorganosiloxane may be arranged in any order such as block, random, alternating and the like.

Herein, in the formulae for polydiorganosiloxane component (II), c denotes a number having a value which is sufficient to provide a viscosity for component (II) of from 0.1 to 10,000 pascal-seconds (100 to 10,000,000 centipoise) at 25° C. Polydiorganosiloxane (II) thus ranges in viscosity from a highly mobile fluid to a slowly moving gum. The particular value of c, for any given viscosity of polydiorganosiloxane (II), will depend upon the nature of the R''' radicals therein. For polydimethylsiloxanes c can range in value from about 30 to about 3000. Herein d denotes a number having a value sufficient to limit the total number of vinyl radicals and phenyl radicals to no more than 5 percent of all organic radicals in the polydiorganosiloxane.

The amounts of liquid copolymeric organopolysiloxane (I) and polydiorganosiloxane (II) that are present in the compositions of this invention may vary widely, depending upon the exact nature of the components and the desired properties of the cured composition obtained therefrom. A range of amounts of from 1 part by weight of one component for every 100 parts by weight of the other component to vice versa is contemplated by this invention.

For the curable coating composition of this invention the liquid copolymeric organopolysiloxane (I) is present in an amount ranging from 1 to 70 parts by weight, and preferably from 5 to 50 parts by weight, based on 100 parts by weight of the polydiorganosiloxane (II) since controllable adhesive release of such compositions is obtained therefrom at said amounts.

The term "controlled release" as used herein mean that the force needed to remove adhesive from the surface of the cured compositions of this invention, under the applying, curing and measuring conditions hereinafter described, can be varied, i.e. increased or decreased, in incremental fashion over a wide range of values by controlling the relative amount of liquid copolymeric organopolysiloxane in the composition to be cured.

The compositions of this invention can further comprise typical silicone adjuvants such as fillers, pigments, dyes and cure-control additives, if desired.

The compositions of this invention are prepared by thoroughly mixing the desired amounts of the liquid copolymeric organopolysiloxane (I) and the polydiorganosiloxane (II) along with any other components. They are then ready for curing, as desired, by mixing therewith a curing amount of a curing catalyst and, optionally, additional curing agents and heating the resulting mixture, e.g. from 50° C. to 250° C., preferably from 100° C. to 150° C., until the desired cure has been obtained.

Any of the well-known silicone curing catalysts can be used to cure the compositions of this invention such as free-radical generating catalysts: such as peroxides; such as benzoyl peroxide, dichlorobenzoyl peroxide and di-t-butyl peroxide, and azo compounds; such as azo-bis-isobutyronitrile, silanol-condensing catalysts; such as salts of heavy metals; such as dibutyltin diacetate and stannous octoate and hydrosilylation catalysts; such as platinum-containing catalysts; such as chloroplatinic acid, platinum on charcoal and chloroplatinic acid complexed with various liquids and rhodium-containing catalysts.

The compositions of this invention are curable in the absence of any additional curing agent since the liquid copolymeric organopolysiloxane (I) functions as a curing agent as well as a strengthening agent, controlled-release agent, etc. However, additional curing agent may be mixed with the compositions of this invention to provide for additional crosslinking in the cured composition, if desired.

Any of the well-known curing agents of the silicone art can be used in the compositions of this invention. Examples of said curing agents include organohydrogenpolysiloxanes; such as those described above as component (b), for reacting with silicon-bonded hydroxyl radicals and/or silicon-bonded vinyl radicals, alkoxy silanes; such as methyltrimethoxy silane, ethyl orthosilicate and ethylpolysilicate and acetoxy silanes; such as methyltriacetoxy silane and ethyltriacetoxysilane, for reacting with silicon-bonded hydroxyl radicals.

The compositions of this invention find extensive utility as solventless silicone compositions; however, they can also be formulated as solutions, dispersions or emulsions if desired. Liquids which can be used to form solutions, dispersions and emulsions include water and non-reactive organic solvents, such as hydrocarbons, halogenated hydrocarbons, ethers, esters, and ketones.

The curable coating compositions of this invention may be applied to any suitable solid substrate such as cellulosic materials such as paper and wood; metals such as aluminum, iron and steel; synthetic polymers such as cured silicones, polyethylene or polypropylene films or sheets, polyethylene or polypropylene films on other surfaces such as on paper, polyamides, such as nylon and polyesters such as Mylar ® (registered trademark of E. I. DuPont de Nemours, Wilmington, Del.; and siliceous materials such as ceramics, glass and concrete.

The coating compositions of this invention are particularly useful as release coatings for paper. Said compositions are applied in a thin layer to the surface of paper and heated to provide a coating with a mass of approximately one gram per square meter of coated paper. In the cured form these thin coatings will release adhesives, such as aggressive acrylic adhesives, with a force that varies with the amount of the liquid copolymeric organopolysiloxane that is used. It is to be understood that said coatings may also be applied in thinner or thicker layers as long as the cure of the coating is not impaired. In the paper release coating art the amount of release coating will generally vary from approximately 0.1 to 2.0 grams per square meter of coated paper.

The coating compositions of this invention are applied to a substrate by any suitable method such as brushing, dipping, spraying, rolling and spreading. Application of said compositions to paper may be done by any of the suitable methods that are well known in the paper coatings art such as by a trailing blade coater, by an air knife, by kiss rolls, by gravure rolls, by printing or by any other known method.

The following (a) and (b) components were used to prepare component (I) of the compositions of this invention disclosed in the examples.

The non-volatile content, also denoted herein as N.V.C., of a material was determined by placing 1.50 grams of the material in an aluminum foil dish, 60 mm. in diameter and 15 mm. deep and heating the sample for 1 hour at 150° C. in an air-circulating oven. The heated sample was then cooled to room temperature and reweighed to determine the weight of the non-volatile material (w). N.V.C., in percent, is equal to 100 w/1.50.

The acid number, also denoted herein as A.N., of a material was determined by titrating 1.00 grams of the material to a bromcresol purple endpoint, using alcoholic KOH, and is equal to the number of mg. of KOH so used.

The viscosity of a material was measured at 25° C. with a Brookfield ® viscometer Model RVF and the value obtained was converted from centipoise to pascal-seconds (Pa·s) for this disclosure by multiplying by 0.001.

Resin A-1—A xylene solution of a resinous copolymeric siloxane, prepared from 45 parts of sodium silicate (41.6° Be) and 20 parts of $(CH_3)_3SiCl$ according to the method of Daudt et al. noted above, containing $(CH_3)_3SiO_{\frac{1}{2}}$ siloxane units and $SiO_{4/2}$ siloxane units of approximately 0.75/1.0 and having A.N.=0.80, SiOH=2.56%, SiH=0% and N.V.C.=70%. By extrapolation to 100% N.V.C. the resinous copolymeric siloxane itself had A.N.=1.14, SiH=0% and SiOH=3.66%.

Resin A-2—Resin A-1 with substantially all of its solvent removed by evaporation at room temperature and atmospheric pressure to N.V.C.=95%; a solid material.

Resin A-3—Similar to, and prepared as, Resin A-1 except having N.V.C.=67.35%, A.N.=0.64, SiH=0.003% and SiOH=1.91%. By extrapolation to 100% N.V.C. the resinous copolymeric siloxane had A.N.=0.95, SiH=0.004% and SiOH=2.84%.

Resin A-4—Similar to, and prepared as, Resin A-1 except having N.V.C.=68.7%, A.N.=0.33, SiH=0% and SiOH=2.02%. By extrapolation to 100% N.V.C. the resinous copolymeric siloxane had A.N.=0.48, SiH=0% and SiOH=2.94%.

Resin A-5—Similar to, and prepared as, Resin A-1 except having an N.V.C.=67.6%, A.N.=1.12 and a Turbidity Index=12.4 (an indirect measurement of SiOH). By extrapolation to 100% N.V.C. the resinous copolymer siloxane had A.N.=1.66.

Fluid B-1—An organohydrogenpolysiloxane liquid having the formula $(CH_3)_3SiO\{(CH_3)_2SiO\}_3\text{-}\{(CH_3)(H)SiO\}_5Si(CH_3)_3$, N.V.C.=100%, A.N.=0.005, SiH=0.74% and SiOH=0.025%.

Fluid B-2—An organohydrogenpolysiloxane liquid having the formula $(CH_3)_3SiO\{(CH_3)(H)SiO\}_{35}Si(CH_3)_3$, N.V.C.=100%, A.N.=0.01, SiH=1.96%, SiOH=0% and a viscosity of 0.03 Pa·s.

Fluid B-3—Same as Fluid B-2 except having A.N.=0.02, SiOH=0% and SiH=1.71%.

Fluid B-4—Same as Fluid B-2 except having A.N.=0.008, SiOH=0.03% and SiH=1.56%.

The following liquid copolymeric organopolysiloxanes, component (I) also denoted herein as liquid resins, were used in the examples to prepare compositions of this invention.

Liquid Resin No. 1—Forty parts of Fluid B-2 and 87.3 parts of Resin A-4 (60 parts of resinous copolymeric siloxane and 27.3 parts of xylene) were mixed to form a homogeneous mixture having 7.6 silicon-bonded hydrogen radicals for every silicon-bonded hydroxyl radical. The homogeneous mixture was heated to 150° C. at atmospheric pressure after which the pressure was reduced sufficiently to volatilize xylene and water. After water ceased to be evolved the mixture was heated at 150° C. at a pressure of 2 Torr (267 Pa) to remove substantially all of the remaining xylene. The resulting copolymeric organopolysiloxane had SiOH=0.30%, SiH=0.50% and a viscosity of 71 Pa·s.

Liquid Resin No. 2—The preparation used for Liquid Resin No. 1 was repeated except that 40 parts of Fluid B-1 and 89.1 parts of Resin A-3 (60 parts of resinous copolymeric siloxane and 29.1 parts of xylene) were mixed to form a homogeneous mixture having 2.9 silicon-bonded hydrogen radicals for every silicon-bonded hydroxyl radical. The resulting liquid copolymeric organopolysiloxane had SiOH=1.64%, SiH=0.002%, A.N.=0.95 and a viscosity of 77.5 Pa·s.

Liquid Resin No. 3—The preparation used for Liquid Resin No. 1 was repeated except that 60 parts of Fluid B-3 and 57.1 parts of the Resin A-1 (40 parts of resinous copolymeric siloxane and 17.1 parts of xylene) were mixed to form a homogeneous mixture having 11.8 silicon-bonded hydrogen radicals for every silicon-bonded hydroxyl radical. The resulting liquid copolymeric organopolysiloxane had SiOH=0.87%, SiH=0.91%, A.N.=0.10 and a viscosity of 0.31 Pa·s.

Liquid Resin No. 4—The preparation used for Liquid Resin No. 1 was repeated except that 600 parts of Fluid B-4 and 1331 parts of Resin A-5 (900 parts of resinous copolymeric siloxane and 431 parts of xylene) were mixed to form a homogeneous mixture. During the heating of this mixture pressure was reduced at 98° C. after 45 minutes of heating and was gradually reduced thereafter over a period of 85 minutes as the temperature was increased to 150° C. The resulting liquid copolymeric organosiloxane had SiOH=1.78%, SiH=0.02%, A.N.=1.4, N.V.C.=98.8% and a viscosity of 354 Pa·s.

Liquid Resin No. 5—Forty parts of Fluid B-3 and 85.7 parts of Resin A-1 (60 parts of resinous copolymeric siloxane and 25.7 parts of xylene) were mixed to form a homogeneous mixture having 5.3 silicon-bonded hydrogen radicals for every silicon-bonded hydroxyl radical. The mixture was devolatilized at room temperature and atmospheric pressure to a N.V.C.=97%. This devolatilized, but not heated, mixture had SiOH=3.82%, SiH=0.35%, A.N.=0.19 and a viscosity of 900 Pa·s. The devolatilized mixture was heated at 150° C. for 2 hours in an air-circulating oven. The resulting liquid copolymeric organopolysiloxane had SiOH=0.48%, SiH=0.56% and A.N.=0.22.

Liquid Resin No. 6—When the preparation of Liquid Resin No. 5 was repeated with solid Resin A-2 instead of Resin A-1, a small percentage of the resin could not be homogeneously mixed with Fluid B-3. When the heterogeneous mixture having SiOH=2.09%, SiH=0.67%, A.N.=0.08, N.V.C.=0.97% and a viscosity of 38.5 Pa·s, was heated, as above, a liquid copolymeric organopolysiloxane having SiOH=0.35%, SiH=0.64% and A.N.=0.08 was obtained.

The following examples are disclosed to further illustrate, but not limit, the present invention. All parts and percentages are by weight, unless otherwise stated. Viscosities were measured as described above. Tensile strength was measured in pounds per square inch and was converted to megapascals (MPa) by multiplying by $6.894757 \times 10^{-3}$ and rounding off. Adhesive release force was measured in grams per inch and was converted to newtons per meter (N/m) by multiplying by $3.860885 > 10^{-1}$ and rounding off.

The coating compositions in the following examples were evaluated for release as follows. A coating composition was coated onto 40 pound super calendared kraft S2S paper at a coating weight of about ½ pound per ream using a Time-Life blade coater for solventless compositions and a Mayer rod for solvent-based compositions and emulsion compositions. The coating was heated at 150° C. for a sufficient period of time to provide a coating having no smear, no rub-off and no migration, as hereinafter defined.

Each cured coating was prepared for release testing according to the following procedure. The cured coating was coated with adhesive using either a solution of Monsanto ® GMS-263 acrylic adhesive (hereinafter Acrylic) or National Starch ® 36-6045 styrene-butadiene rubber adhesive (hereinafter SBR). The adhesive solution was applied to the cured coating at a wet thickness of 3 mils (76.2 μm) using a draw down bar. The applied adhesive was air-dried at room temperature for one minute, heated at 65° C. for one minute and then cooled to room temperature again for 1 minute. A sheet of 60 pound matte litho was applied to the dried adhesive and the resulting laminate was pressed through two rolls of an off-set printer and aged for 20 hours at 70° C.

Release testing of the laminates was accomplished by cooling the aged laminates to room temperature, cutting the cooled laminates into 1 inch (25.4 mm) strips and pulling the matte/adhesive lamina from the kraft paper/coating lamina at an angle of 180° ($\pi$ radians) at 400 inches/minute (0.17 m/s). The force, in grams per inch, that was required to separate the laminae was noted.

Smear of a paper-coating was measured by lightly rubbing the applied and heated coating with a finger and looking for hazing of the coating; no hazing means no smear.

Rub-off of a paper-coating was measured by vigorously rubbing the applied and heated coating with a finger, trying to remove the coating from the paper; no removal means no rub-off.

Migration of a paper-coating was measured by placing a test strip of No. 5910 3M ® brand transparent tape on the applied and heated coating, adhesive-bearing surface in contact with the coating, and rubbing the strip 5 to 10 times with a finger to adhere to it the coating. The strip of transparent tape was then removed from the coating and its adhesive-bearing surface was doubled, end to end, onto itself and pressed firmly together. The force needed to separate the doubled test strip was approximately the same as the force needed to separate a doubled strip of fresh tape for a coating having no migration.

EXAMPLES 1 to 3

A solventless silicone coating composition, curable by a SiVi+SiH addition reaction, was prepared by mixing 98.12 parts of $(CH_2=CH)(CH_3)_2SiO\{(CH_3)_2SiO\}_{41}\text{-}\{(CH_3)(CH_2=CH)SiO\}_{0.8}Si(CH_3)_2(CH=CH_2)$, 1.04 parts of $\{(CH_2=CH)(CH_3)SiO\}_x$ as a cure-rate modifier, wherein x has an average value of about 5, and 0.84 parts of a catalyst composition, prepared according to U.S. Pat. No. 3,960,810 and consisting of 3.14 percent $RhCl_3\cdot(CH_3CH_2CH_2CH_2S\text{-}CH_2CH_2CH_2CH_3)_3$ and 96.86 percent toluene. A curing agent having the formula $(CH_3)_3SiO\{(CH_3)(H)SiO\}_{35}Si(CH_3)_3$ was mixed with each of four portions of the silicone coating composition to provide four curable silicone coating compositions. Liquid Resin No. 1 was mixed simultaneously with the curing agent in each of three of the four curable silicone coating compositions to provide three compositions of this invention. All formulations were evaluated for adhesive release. The formulations and adhesive release results are recorded in Table I as Control i and Examples 1, 2 and 3. Adhesive release is shown to vary directly with the amount of liquid resin used. Smooth release at the high release values was also obtained.

EXAMPLE 4 and 5

These examples illustrate the present invention wherein the Liquid Resin No. 1 serves as the sole curing agent for the silicone coating composition. Examples 2 and 3 were repeated except that the 3 parts of curing agent were omitted. See Table I for formulations and adhesive release force thereof, recorded as Examples 4 and 5. Note that the adhesive release force varies directly with the amount of liquid resin used.

EXAMPLES 6 to 8

The silicone coating composition and the curing agent described in Examples 1 to 3 were mixed in various proportions to provide four curable silicone coating compositions. Liquid Resin No. 2 was mixed simultaneously with the curing agent in each of three of the four curable silicone coating compositions to provide three compositions of this invention. The four formulations were evaluated for adhesive release. The formulations and adhesive release results are recorded in Table I was Control ii and Examples 6, 7 and 8. Note that adhesive release varies directly with the amount of liquid resin used.

EXAMPLES 9 TO 11

The silicone coating composition and the curing agent described in Examples 1 to 3 were mixed in a ratio of 100 to 4, respectively, along with various portions of Liquid Resin No. 3 to provide three compositions of this invention which were evaluated for adhesive release. The formulations and their adhesive release force are recorded in Table I as Examples 9, 10 and 11. These compositions, because of their high release force, would be useful as an adhesive tape back-sizing composition.

TABLE I

| Reference Number | Curing Agent, pph(1) | Liquid Resin No. | pph(2) | Adhesive Release, N/m Adhesive Release Acrylic | SBR |
|---|---|---|---|---|---|
| Control i | 4.0 | None | 0 | 17 | 14 |
| Example 1 | 3.0 | 1 | 10 | 21 | 23 |
| Example 2 | 3.0 | 1 | 25 | 29 | 27 |
| Example 3 | 3.0 | 1 | 50 | 62 | 42 |
| Example 4 | 0 | 1 | 25 | 27 | 29 |
| Example 5 | 0 | 1 | 50 | 48 | 48 |
| Control ii | 4.0 | None | 0 | 16 | 15 |
| Example 6 | 4.4 | 2 | 11 | 22 | 24 |
| Example 7 | 5.0 | 2 | 25 | 24 | 29 |
| Example 8 | 5.8 | 2 | 67 | 75 | 87 |
| Example 9 | 4.0 | 3 | 10 | 32 | 25 |
| Example 10 | 4.0 | 3 | 20 | 80 | 34 |
| Example 11 | 4.0 | 3 | 40 | (3) | 66 |

(1)Parts of curing agent per one hundred parts of solventless silicone coating composition.
(2)Parts of liquid resin per one hundred parts of solventless silicone coating composition.
(3)Release force exceeds the tear strength of the paper substrate.

EXAMPLES 12 TO 15

A solvent-based silicone coating composition, curable by a SiOH+SiH condensation reaction, was prepared by mixing 29.1 parts of a silanol-terminated polydimethylsiloxane gum having a viscosity of approximately $6.0\times10^3$ Pa·s ($6.0\times10^6$ cP) and containing 1 percent pyrogenic silica, 0.9 parts of a curing agent having the formula $(CH_3)_3SiO\{(CH_3(H)SiO\}_{3.5}Si(CH_3)_3$ and 70.0 parts of xylene. Five 37.5 part portions of the solvent-based silicone coating compositions were separated for testing. Liquid Resin No. 1 was mixed with four of the five portions in amounts of 1.25, 3.75, 11.25 and 33.75 parts, respectively, and the five compositions were then diluted with sufficient heptane so that each contained 15 percent solids (gum plus curing agent plus Liquid Resin No. 1). A 20 part portion of each of the five 15-percent-solids solutions was separated and catalyzed with 0.3 parts of dibutyltin diacetate.

The catalyzed solutions were cast on a mercury surface and evaporated to dryness overnight. The resulting solventless films, 20 to 30 mils in thickness, were heated at 150° C. for 5 minutes to effect a post cure of the film, after which they were evaluated for tensile strength and elongation according to ASTM D-412. The results, recorded in Table II as Control iii and Examples 12, 13, 14 and 15 show the strengthening effect of the liquid resin in this curable silicone composition.

For comparison purposes an additional four 37.5 part portions of the above described solvent-based silicone coating composition were separated for testing. The resinous copolymeric siloxane (Resin A-3) that was used in the preparation of Liquid Resin No. 1 was mixed with three of the four portions in amounts of 1.25, 3.75 and 11.25 parts, respectively. To the fourth portion there was added 3.75 parts (based on solids) of a mixture of 60 parts (based on solids) of the resinous copolymeric siloxane (Resin A-3) and 40 parts of the organohydrogenpolysiloxane (Fluid B-2) that were used in the preparation of Liquid Resin No. 1. The four solutions were then diluted to 15 percent solids, catalyzed with dibutyltin diacetate, cast on mercury and evaporated to dryness, and the resulting films were post cured and evaluated as described above. The results, recorded in Table II for Comparison a, Comparison b and Comparison c, for the compositions prepared from Resin A-3, show that strengthening of the curable silicone composition occurs, but to a lesser amount than that available in the composition of this invention. The results for Comparison d, also recorded in Table II, shows a strengthening of the curable silicone composition that is comparable to that available from the compositions of this invention; however, after aging Composition d hardened whereas the compositions of this invention remained elastomeric.

EXAMPLES 16 TO 18

Examples 12, 13 and 14 were repeated using Liquid Resin No. 3 instead of Liquid Resin No. 1. Similar results were obtained and are recorded in Table II as Examples 16, 17 and 18.

TABLE II

| Reference Number | Curing Agent pph(1) | Liquid Resin No. | Liquid Resin pph(2) | Physical Properties Tensile, MPa | Elongation, % |
|---|---|---|---|---|---|
| Control iii | 3 | None | 0 | 0.345 | 800 |
| Example 12 | 3 | 1 | 10 | 1.45 | 900 |
| Example 13 | 3 | 1 | 25 | 2.41 | 1100 |
| Example 14 | 3 | 1 | 50 | 2.00 | 140 |
| Example 15 | 3 | 1 | 75 | 1.03 | 10 |
| Comparison a | 3 | * | 10 | 0.517 | 1000 |
| Comparison b | 3 | * | 25 | 0.965 | 1300 |
| Comparison c | 3 | * | 50 | 1.17 | 1500 |
| Comparison d | 3 | * | 25 | 2.34 | 1100 |
| Example 16 | 3 | 3 | 10 | 1.31 | 800 |
| Example 17 | 3 | 3 | 25 | 1.93 | 900 |
| Example 18 | 3 | 3 | 50 | 2.48 | 100 |

(1)Parts of curing agent per one hundred parts of silanol-terminated polydimethylsiloxane gum.
(2)Parts of liquid resin per one hundred parts of silanol-terminated polydimethylsiloxane gum plus liquid resin.
*See Examples 12 to 15 disclosure.

EXAMPLE 19

An aqueous silicone coating emulsion composition of this invention was prepared by preparing a first mixture consisting of 39.7 parts of a silanol-terminated polydimethylsiloxane fluid having a viscosity of approximately 4.0 Pa·s, 5.8 parts of a silanol-terminated polydimethylsiloxane fluid having a viscosity of approximately 70 mPa·s and 4.5 parts of Liquid Resin No. 3; a second mixture consisting of 13.32 parts of polyvinylalcohol (Lenol 22-88 from Air Products) 0.5 parts of sodium alkylarylpolyether sulfonate (Triton X-200 from Rohm & Haas) and 8.7 parts of deionized water; and a third mixture consisting of 27 parts of deionized water and 0.5 parts of ethylene glycol. The first mixture and second mixture were hand-mixed to form a "thick phase" which was passed through a colloid mill, at a setting of 15, into the third mixture and hand-mixed therein.

A comparison emulsion was identically prepared except the first mixture consisted of 41.5 parts of the 40 Pa·s fluid, 6.0 parts of the 70 mPa·s fluid and 2.5 parts of a curing agent having the formula $(CH_3)_3SiO\{(CH_3)(H)SiO\}_{35}Si(CH_3)_3$.

Ten parts of each emulsion were added to 89 parts of deionized water to form two emulsions and the resulting emulsions were each catalyzed with 1 part of a catalyst mixture consisting of 50 percent dioctyltin dilaurate, 41 percent deionized water and 9 percent Triton X-200.

Both emulsions were found to release aggressive acrylic adhesive with a force of 20 N/m and SBR adhesive with a force of 33 N/m.

EXAMPLE 20

A mold-coating composition of this invention was prepared by mixing 120 parts of the solvent-based coating composition of Examples 12 to 15, 12 parts of Liquid Resin No. 4 and 100 parts of heptane. The mixture was catalyzed with 2.25 percent of dibutyltin diacetate, applied to three aluminum panels and a muffin pan and heated to about 110° C. for about 10 minutes to effect a cure of the coating to the non-tacky state. Urethane foam was placed and cured on the coated panels and in the muffin pan. Release of the polyurethane foamed articles was excellent.

EXAMPLES 21 AND 22

Examples 7 and 8 were repeated except that Liquid Resin No. 5 was used instead of Liquid Resin No. 2. Example 21, containing 25 parts of Liquid Resin No. 5 released acrylic adhesive with a force of 50 N/m and SBR adhesive with a force of 20 N/m. Example 22, containing 67 parts of Liquid Resin No. 5 would not release acrylic adhesive before the coated paper substrate tore, but released SBR adhesive with a force of 41 N/m. As a comparison, Example 22 was repeated except the unheated mixture that was used to prepare Liquid Resin No. 5 was used instead of the liquid resin. The resulting comparison composition failed to release acrylic adhesive and released SBR adhesive with a force of 92 N/m.

EXAMPLES 23 AND 24

Examples 7 and 8 were repeated except that Liquid Resin No. 6 was used instead of Liquid Resin No. 2. Example 23, containing 25 parts of Liquid Resin No. 6 released acrylic adhesive with a force of 71 N/m and SBR adhesive with a force of 24 N/m. Example 24, containing 67 parts of Liquid Resin No. 6 would not release acrylic adhesive before the coated paper substrate tore, but released SBR adhesive with a force of 56 N/m. As a comparison, Example 24 was repeated except the unheated mixture that was used to prepare Liquid Resin No. 6 was used instead of the liquid resin. The resulting comparison composition failed to release acrylic adhesive and released SBR adhesive with a force of 86 N/m.

That which is claimed is:
1. A composition comprising
   (I) a liquid copolymeric organopolysiloxane, prepared by a method comprising
   (A) forming a homogeneous mixture having an acid number greater than zero and comprising
      (a) an organic solvent solution of a resinous copolymeric siloxane containing silicon-bonded hydroxyl radicals and consisting essentially of $R_3SiO_{\frac{1}{2}}$ siloxane units and $SiO_{4/2}$ siloxane units wherein the ratio of the number of said $R_3SiO_{\frac{1}{2}}$ siloxane units to the number of said $SiO_{4/2}$ siloxane units has a value of from 0.6/1 to 0.9/1 and each R denotes, independently, a monovalent hydrocarbon radical and
      (b) a liquid organohydrogenpolysiloxane wherein each organic radical is, independently, a monovalent hydrocarbon radical, there being an average of at least one silicon-bonded hydrogen radical per molecule of said organohydrogenpolysiloxane, and (B) heating said homogeneous mixture to remove substantially all of said organic solvent therefrom and (II) a polydiorganosiloxane having the formula ZR'''₂SiO(R'''₂SiO)_cSiR'''₂Z wherein Z denotes hydroxyl or R''' and each R''' denotes independently, a monovalent hydrocarbon radical, there being an average of at least two vinyl radicals or silicon-bonded hydroxyl radicals per molecule and c has a value sufficient to provide a viscosity of from 0.1 to 10,000 Pa·s at 25° C. for the polydiorganosiloxane.

2. A composition according to claim 1 wherein the liquid copolymeric organopolysiloxane is prepared from a homogeneous mixture having an acid number of from 0.1 to 1, extrapolated to the solvent-free state.

3. A composition according to claim 2 wherein the ratio of the total number of silicon-bonded hydrogen atoms in component (b) to the total number of silicon-bonded hydroxyl radicals in component (a) has a value of at least about 2.

4. A composition according to claim 3 wherein the liquid copolymeric organopolysiloxane is prepared from a resinous copolymeric siloxane consisting of (CH₃)₃SiO₁ siloxane units and SiO_{4/2} siloxane units and having a silicon-bonded hydroxyl content of from 1 to 5 percent by weight and an acid number of from 0.3 to 1.4.

5. A composition according to claim 4 wherein the liquid copolymeric organopolysiloxane is prepared from an organohydrogenpolysiloxane having the formula (R'')(CH₃)₂SiO{(CH₃)₂SiO}_a{(CH₃)(H)SiO}_b-Si(CH₃)₂(R'') wherein each R'' denotes, independently, a methyl radical or a hydrogen radical and a and b denote numbers, each having an average value of zero or more.

6. A composition according to claim 5 wherein the organohydrogenpolysiloxane that is used to prepare the liquid copolymeric organopolysiloxane has the formula (CH₃)₃SiO{(CH₃)(H)SiO}_bSi(CH₃)₃ wherein b has an average value of from 30 to 70.

7. A composition according to claim 6 wherein the liquid copolymeric organopolysiloxane is prepared from 40 to 60 parts by weight of resinous copolymeric siloxane and from 40 to 60 parts by weight of organohydrogenpolysiloxane.

8. A composition according to claim 7 wherein the polydiorganosiloxane has the formula (CH₂=CH)(CH₃)₂Si{(CH₃)₂SiO}_{c(1−d)}{(CH₃)(CH₂=CH)SiO}_{cd}Si(CH₃)₂(CH=CH₂) wherein d has a value sufficient to limit the total number of vinyl radicals to no more than 5 percent of all organic radicals in the polydiorganosiloxane.

9. A composition according to claim 7 wherein the polydiorganosiloxane has the formula HO(CH₃)₂SiO(CH₃)₂SiO_cSi(CH₃)₂OH.

10. A composition according to claims 1, 2, 3, 4, 5, 6, 7, 8 or 9 further comprising an organohydrogenpolysiloxane curing agent.

11. A composition obtained by mixing a curing amount of a curing catalyst with the composition of claim 10.

12. A composition obtained by mixing a curing amount of a curing catalyst with the composition of claim 1, 2, 3, 4, 5, 6, 7, 8 or 9.

13. A substrate bearing the cured composition of claim 11.

14. A substrate bearing the cured composition of claim 12.

* * * * *